(12) United States Patent
Randolph

(10) Patent No.: US 7,153,092 B1
(45) Date of Patent: Dec. 26, 2006

(54) AUTOMOTIVE GRILL INCORPORATING ROTATABLE TURBINE STRUCTURES

(76) Inventor: Kendrick Randolph, 1308 Bramble La., Mansfield, TX (US) 76063

( * ) Notice: Subject to any disclaimer, the term of this patent is extended or adjusted under 35 U.S.C. 154(b) by 177 days.

(21) Appl. No.: 11/023,814

(22) Filed: Dec. 28, 2004

(51) Int. Cl.
*F03B 13/00* (2006.01)

(52) U.S. Cl. ........................................ 415/55

(58) Field of Classification Search ................. 416/55, 416/54, 309, 68.1
See application file for complete search history.

(56) References Cited

U.S. PATENT DOCUMENTS

| | | |
|---|---|---|
| 2,762,469 A | 9/1956 | Lyon |
| 3,722,958 A | 3/1973 | Marshall |
| 3,878,913 A | 4/1975 | Lionts et al. |
| 4,093,035 A | 6/1978 | Fletcher |
| 4,254,843 A | 3/1981 | Han et al. |
| 5,046,449 A | 9/1991 | Nelson |
| 5,290,094 A | 3/1994 | Gregg |
| D454,096 S | 3/2002 | Marchese et al. |
| D494,895 S | 8/2004 | Marchese et al. |
| 6,776,459 B1 | 8/2004 | Fitzgerald |

*Primary Examiner*—Edward K. Look
*Assistant Examiner*—Dwayne J White
(74) *Attorney, Agent, or Firm*—Baker Botts L.L.P.

(57) ABSTRACT

An automotive grill having at least one wind driven rotatable turbine which is adapted for attachment to the air-inlet of a conventional automobile. The turbine is releasably mounted to the grill in a manner such that airflow or wind through the grill causes rotation to be imparted to the turbine structure. The turbines may create an interesting abstract decorative effect or may be used to re-direct the flow of incoming air or even to turbulate the incoming airflow prior to passing through the radiator and/or condenser coil of a conventional automotive air-conditioning system. The turbine structure may include one or several turbines which are selectively mounted on the grill in various orientations in order to be aesthetically coordinated with the pattern or styling of the grate portion of the grill or even other portions of the automobile.

18 Claims, 5 Drawing Sheets

AUTOMOTIVE GRILL INCORPORATING ROTATABLE TURBINE STRUCTURES

CROSS-REFERENCE TO RELATED APPLICATIONS

Not applicable.

FIELD OF THE INVENTION

This invention relates to automotive grills, and more particularly, to an automotive grill having at least one rotatable turbine configured thereon for creating an interesting aesthetic effect, or for turbulating or re-directing the airflow passing therethrough

BACKGROUND OF THE INVENTION

Virtually all front-engine fossil fuel powered automobiles have an air-inlet at the front portion thereof for allowing fresh ambient air into the engine compartment. This air inlet is covered by a grill that protects the intricate components of the engine and provides an aesthetically pleasing finish to the automobile's overall decor. Typically, a radiator or condenser coil of the automobile's air-conditioner system is disposed directly behind the grill that operates to utilize the incoming airflow through the grill to provide thermal cooling for the engine or human occupants thereof respectively. Throughout this document, the term 'automobile' will be defined as any vehicle having a grill disposed on the front portion thereof, wherein examples of such automobiles include trucks, pick-ups, sedans, coupes, sport cars, stationwagons, and tractors.

Devices such as those described in U.S. Pat. No. 3,878,913 to Lionts, U.S. Pat. No. 4,093,035 to Fletcher, and U.S. Pat. No. 4,254,843 to Han have been proposed which utilize incoming airflow through the front grill of a moving automobile in order to enact rotational movement of a turbine-like structure for the purpose of generating an electric current. Although each of these devices comprises an air driven turbine, the turbine is substantially concealed from view and thus does not operate to enhance the visual decorative effect of the front grill of a conventional automobile. Moreover, the turbine mechanisms as described cannot act to re-direct or turbulate (produce turbulent flow) the air-stream forward of the radiator, which is typically positioned rearward of the grill, for enhanced cooling purposes.

Other devices which utilize wind or airflow incident upon a moving automobile in order to impart a rotational motion thereon have been known in the art. In many cases, an important aspect of these rotational devices has been to enhance the aesthetic appearance of the automobile, wherein examples of such devices includes U.S. Pat. No. 2,762,469 to Lyon, U.S. Pat. No. 3,722,958 to Marshall, and U.S. Pat. No. 5,290,094 to Gragg. Nevertheless, none of these devices disclose a utility for use upon any other portion of an automobile other than over the outer portions of the wheels thereof.

None of the aforementioned patents, taken either singularly or in combination, are seen to describe or suggest the present invention as disclosed or claimed.

SUMMARY OF THE INVENTION AND OBJECTIVES

The present invention is directed to a grill, which is adapted for attachment to the front air-inlet of a conventional automobile, having at least one wind driven turbine configured thereon. The turbine or plurality of turbines are preferentially mounted to the grill in such a manner to be visually perceptible from outside of the automobile in order to create an aesthetically pleasing decorative effect. Additionally, the turbine may serve to re-direct the flow of incoming air or even to turbulate the incoming airflow prior to passing through the radiator and/or condenser coil of a conventional automotive air-conditioning system.

Preferably, the turbine spins about an axis which is generally parallel to the plane of the grill and thus perpendicular to the direction of the incoming wind or airflow. Each turbine generally comprises a plurality of elongated blades which are affixed to bearing hubs at either end thereof for rotation about an axle. Further, the chord of each blade is oriented at a predetermined angle relative to the tangent of its direction of travel such that airflow thereacross causes a rotational motion to be imparted to the turbine. A removable axle mounting mechanism is provided which allows the turbine to be easily removed and replaced from or to the grill. In this manner, other turbines having varying color schemes yielding differing visual effects or even turbines having varying blade designs that modify the aerodynamic airflow pattern entering the engine compartment may be easily implemented by a user.

It is therefore an object of the present invention to provide an automotive grill incorporating rotatable turbine structures for creating an aesthetically pleasing decorative effect to a conventional automobile.

A related object of the present invention is to provide an automotive grill incorporating rotatable turbine structures, wherein the rotatable turbine serves to compliment the overall aesthetic design of the associated grill.

Another object of the present invention is to provide an automotive grill incorporating rotatable turbine structures, wherein the turbine is operable for altering the aerodynamic characteristics of an airflow pattern which passes through the grill.

Another object of the present invention is to provide an automotive grill incorporating rotatable turbine structures wherein the turbine is easily interchangeable with other turbines having varying color schemes or physical design, thereby exhibiting an abstract decorative effect which is personalized to suit the user's taste.

These and other objects will become readily apparent to those familiar with the construction and use of automotive grills and will become apparent in the following portions of the specification, wherein the detailed description is for the purpose of fully disclosing preferred embodiments of the invention without placing limitations thereon.

BRIEF DESCRIPTION OF THE DRAWINGS

For a more complete understanding of the present invention, and the advantages thereof, reference is now made to the following descriptions taken in conjunction with the accompanying drawings in which.

DETAILED DESCRIPTION OF THE PREFERRED EMBODIMENTS

Figure 1:
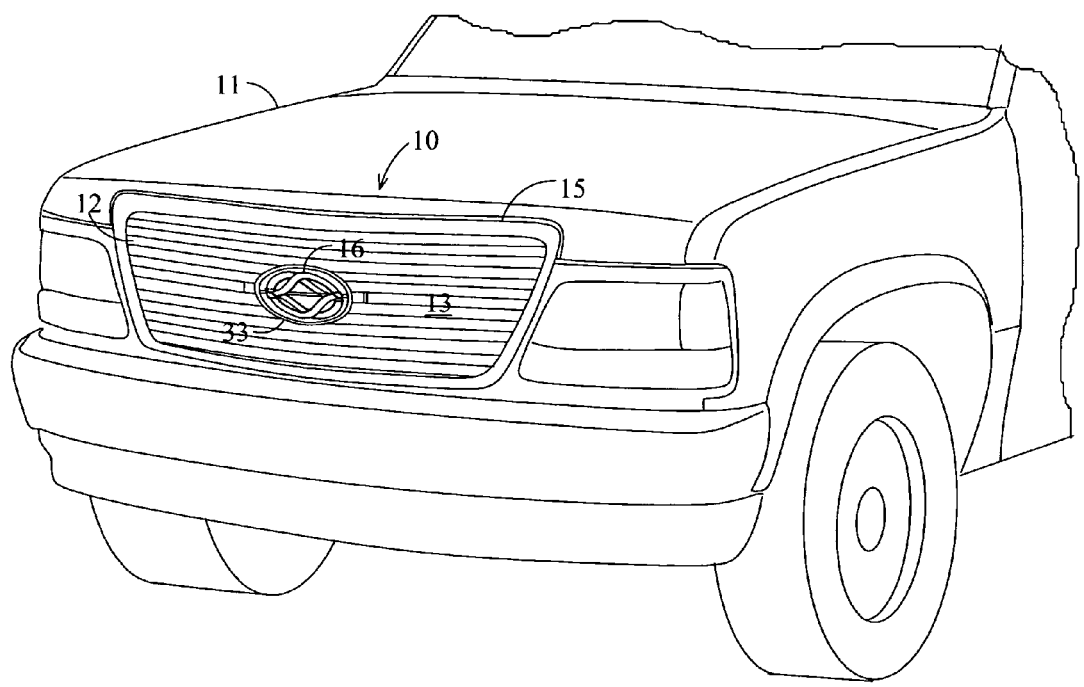
FIG. 1 is a perspective view of a preferred embodiment of the present invention mounted in operative engagement over the air-inlet of a conventional automobile.
Figure 2:
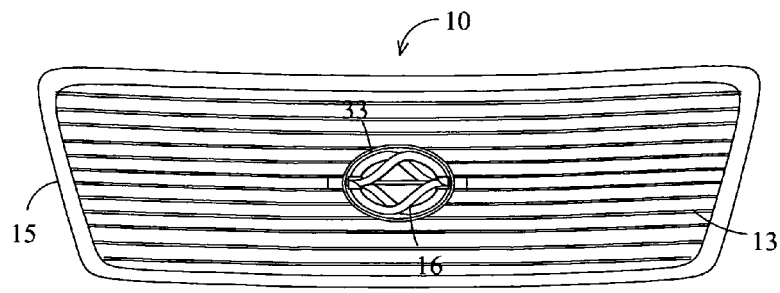
FIG. 2 is a front elevational view of the embodiment of FIG. 1.
Figure 3:
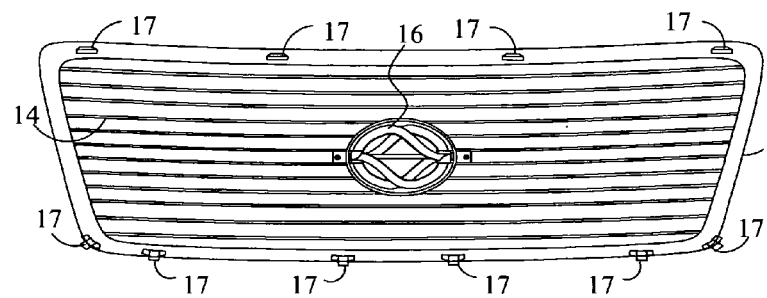
FIG. 3 is a rear elevational view of the embodiment of FIG. 1.
Figure 4:
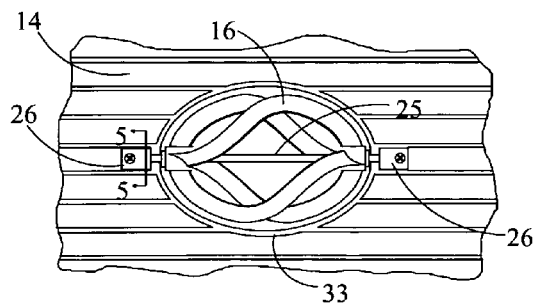
FIG. 4 is an enlarged partial rear elevational view of the embodiment of FIG. 1 showing a turbine which is mounted to the grate portion thereof.
Figure 5:
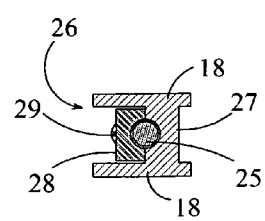
FIG. 5 is an enlarged cut-away side elevational view taken at 5—5 showing the axle mounts of the embodiment of FIG. 4.

Referring now to the drawings, FIGS. 1–17 represent several embodiments and designs of an automotive grill incorporating rotatable turbine structures. Each of the various designs, however, utilize a common novel feature of an automotive grill which has at least one rotatable turbine configured thereon for modification of the air-flow therethrough as well as to enhance the aesthetic decorative effects thereof.

FIG. 1 shows an embodiment of an automotive grill 10 incorporating a rotatable turbine 16 of the present invention in operative engagement mounted on the air-inlet of a conventional automobile 11. The device 10 as shown generally comprises a grate portion 12 having a front surface 13, rear surface 14, and an outer periphery 15 with a wind-driven rotatable turbine 16 mounted proximate the central portion thereof. The grate portion 12 as shown includes a plurality of vertically spaced horizontally extending slats thereby forming a generally planar-shaped structure for covering the air-inlet portion of the automobile. Although the present embodiment describes the use of a plurality of horizontally extending slats, it is to be understood that any geometric pattern of the grate portion may be utilized which is adapted to provide a protective covering across the air-inlet portion of the automobile 11 while allowing air to flow freely into the engine compartment of the automobile. Grill mounting brackets 17 are attached to the rear surface 14 of the grate portion 12 proximate the outer periphery thereof for attachment over the air-inlet proximate the front portion of the automobile 11.

Figure 6:
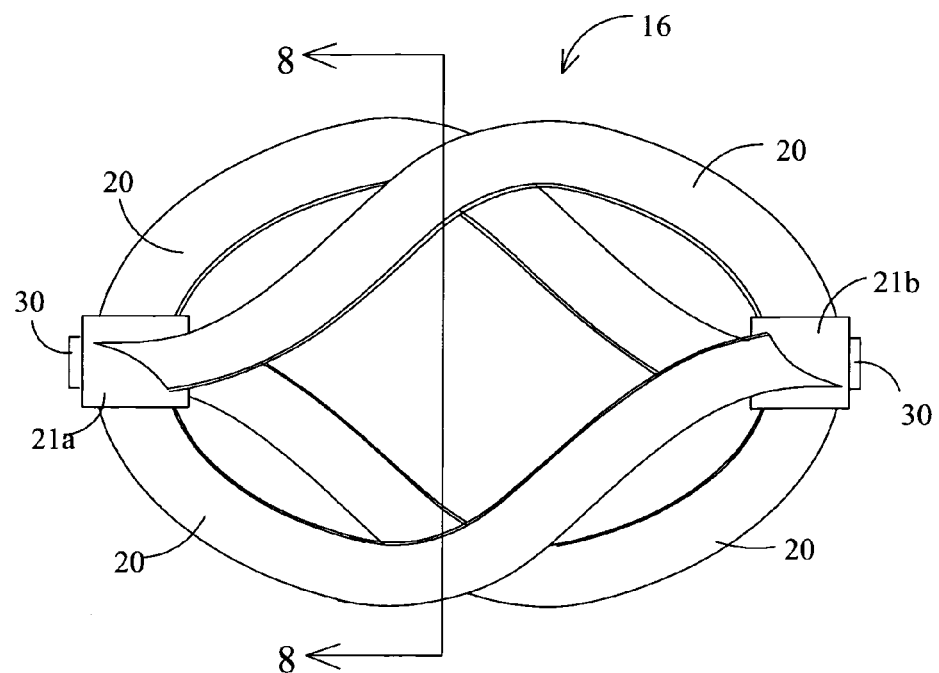
FIG. 6 is a front elevational view of the turbine of the embodiment of FIG. 1.
Figure 7:
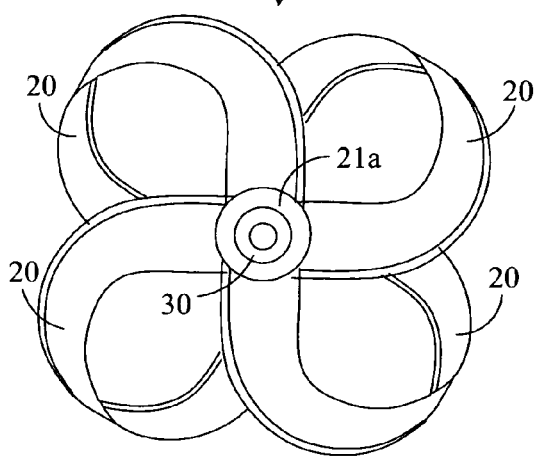
FIG. 7 is a side elevational view of the turbine of the embodiment of FIG. 1.
Figure 8:
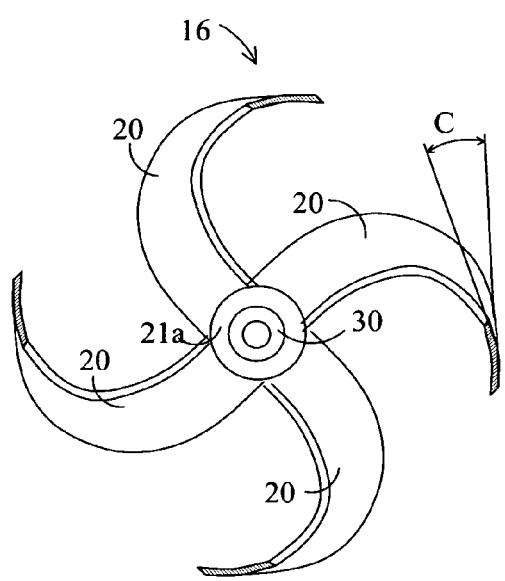
FIG. 8 is a side cut-away elevational view taken at 8—8 depicting the chords of each of the blades of the turbine of FIG. 6.

The rotatable turbine of the present invention generally comprises a plurality of radially equidistant elongated blades 20, each having two ends which are integrally connected to a pair of hubs (21a, and 21b) as best shown in FIGS. 6–8. Although the turbine 16 may be made from any material which will maintain its shape during normal use, preferably the turbine is fabricated of metal using commonly known metallic casting techniques, wherein the surface thereof may have a chrome plated, anodized, or painted layer applied thereto in order to provide a finished appearance. Alternatively, varying regions of the blades may incorporate differing colored layers (two-tone color scheme) or even have differing levels of reflectivity in order to create an interesting visual effect while spinning. As shown in the present embodiment, each blade 20 extends from the first hub 21a to the second hub 21b in a helical-like fashion which causes the overall profile of the turbine 16 to have a generally oval shape. Nevertheless, it is to be appreciated that other blade designs or shape of the turbine may be implemented without deviating from the spirit or scope of the invention. For example, other blade designs may include a plurality of blades which extend linearly from the first to second hub. Alternatively, another conceivable blade design contemplates an elongated hub structure which extends the entire length of the turbine's axis having a plurality of radially equidistant blades that interconnect thereto throughout the length thereof. Examples of possible varying shapes of the turbine may include circular, rectangular, frusto-circular, or frusto-ovular shaped profiles.

As shown in the cross-sectional view of FIG. 8, each blade is formed such that the chord (designated as C in the drawings) thereof exists at a predetermined angle relative to the tangent of its direction of travel. In this manner, airflow which progresses through the turbine at a direction which is perpendicular to the orientation of the axle will cause a rotational motion to be imparted thereto. Thus, as airflow through the grill is generated by either forward movement of the automobile or by airflow generated by a conventional cooling fan, which forcibly pulls air therethrough, rotational motion of the turbine 16 is developed that serves to redirect or disperse airflow through the device 10 as well as to create an interesting abstract decorative effect. Additionally, the weight of the blades causes the turbine to continue spinning for a period of time subsequent to stalling of the airflow, such as experienced by the automobile during momentary stops at traffic signals and the like, wherein the continued spinning being principally due to rotational momentum of the spinning blades.

The turbine 16 is adapted to rotate about an elongated rod defining an axle 25 that preferably extends generally parallel with the plane formed by the grate portion 12, wherein both ends of the axle are releasably secured to the grate portion via a pair of axle mounts 26. Centrally disposed within each of the hubs (21a, and 21b) are oil-filled sleeve bearings 30 each having an inside diameter which is sized to fit over the axle 25 thereby allowing the turbine 16 to freely rotate relative thereto. Each axle mount 26 comprises a mount seat 27, which is integrally attached in between two adjacent slats, having a semi-circular depression formed therein for placement of one end portion of the axle therein. The ends of the axle are releasably held within the seats via a pair of mount brackets 28, which have complimentary semi-circular shaped depressions formed therein as well, are releasably secured to the seats 27 via screws 29. Thus the turbine 16 may be easily removed from the grate portion by removing both screws 29 and their associated mount brackets 28 therefrom followed by removing the axle 25 and consequently the turbine 16 from the seats. Once the axle is totally free of the grate portion 12, the turbine may be serviced or replaced with another turbine by sliding the axle out from within the bearings. The aforedescribed procedure is reversed in order to re-mount the turbine onto the grate portion. In this manner, other turbines having varying color schemes or blade patterns may be interchangeably mounted onto the grate portion in order to provide an automotive grill which is styled to suit the user's taste.

Although the turbine may be disposed within a depression formed in the front surface 13 of the grate portion, preferably the turbine is disposed in a through hole, which extends from the front to the rear surface of the grate portion. The hole has a shape which is similar to the profile of the turbine and slightly larger in order to allow the turbine to rotate freely therein. Most preferably, an annular shroud 33 encases the periphery of the hole in order to enhance the structural rigidity of the grate portion 12 as well as to add an additional aesthetic appeal.

As previously mentioned hereinabove, the novel rotatable turbine structure may be implemented on a grill structure having virtually any aesthetically pleasing pattern or structural makeup. Preferably, the rotatable turbine will be mounted on a grate portion in a manner that enhances or compliments any pattern fashioned on the outer surface thereof. FIGS. 9 through 17 depict several alternative embodiments of an automotive grill utilizing the novel concept of at least one rotatable turbine which is releasably mounted thereon. In all of the embodiments of FIGS. 9 through 17, the rotatable turbine(s) 16, grill mounting brackets 17, shroud(s) 33, axle 25, and axle mounts 26 are similar in design and construction to the embodiment of FIGS. 1 through 8. As can be clearly seen, the rotatable turbine may oriented horizontally, diagonally, or even vertically upon the grate portion. Moreover, virtually any quantity of rotatable turbines may be configured on a grill having virtually any orientation.

Figure 9:
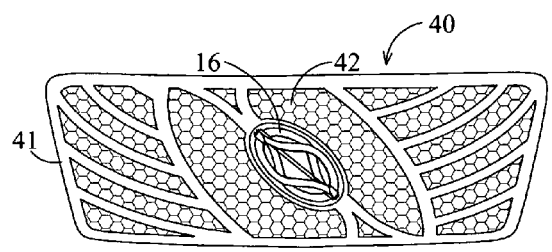
FIG. 9 is a front elevational view of an alternative embodiment of the present invention showing a turbine which is configured in a diagonal orientation.
Figures 10, 11:
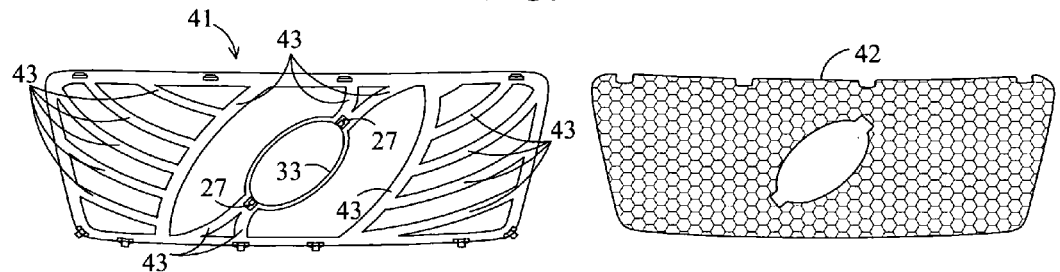
FIG. 10 is a rear elevational view of the faceplate of the embodiment of FIG. 9 shown with the webbing layer and turbine removed therefrom.
FIG. 11 is a rear elevational view of the webbing layer of the embodiment of FIG. 9.
Figure 12:
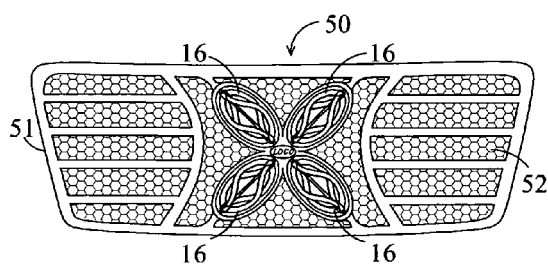
FIG. 12 is a front elevational view of an alternative embodiment of the present invention showing a plurality of turbines which are configured on the grate portion in a diagonal orientation.
Figures 13, 14:
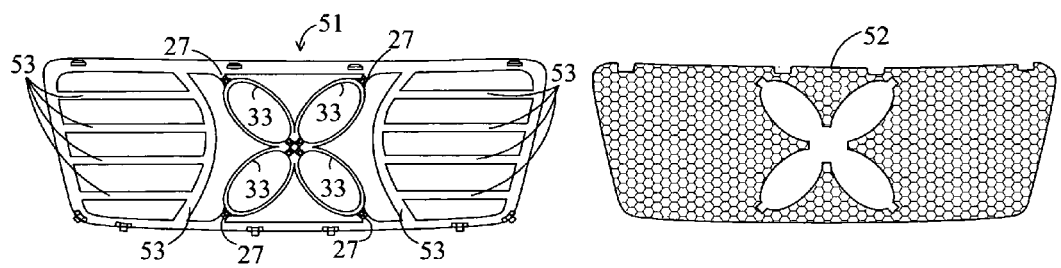
FIG. 13 is a rear elevational view of the faceplate of the embodiment of FIG. 12 shown with the webbing layer and plurality of turbines removed therefrom.
FIG. 14 is a rear elevational view of the webbing layer of the embodiment of FIG. 12.
Figure 15:
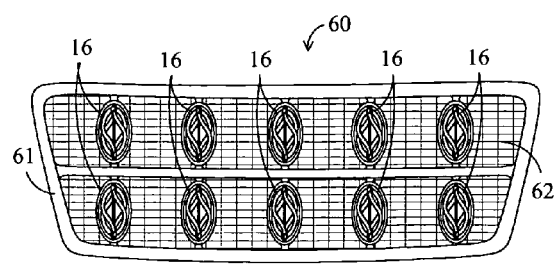
FIG. 15 is a front elevational view of an alternative embodiment of the present invention showing a plurality of turbines which are configured on the grate portion in a vertical orientation.
Figure 16:
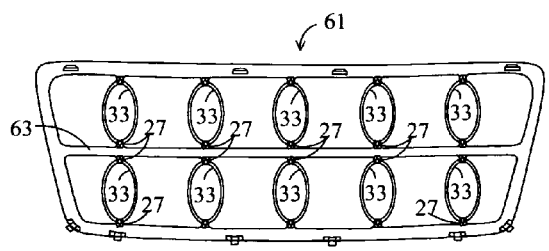
FIG. 16 is a rear elevational view of the faceplate of the embodiment of FIG. 15 shown with the webbing layer and plurality of turbines removed therefrom.
Figure 17:
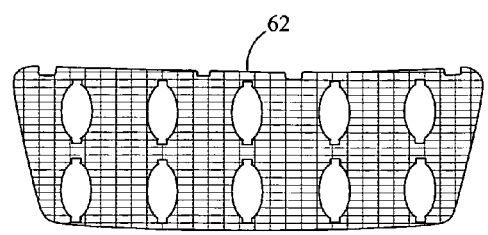
FIG. 17 is a rear elevational view of the webbing layer of the embodiment of FIG. 15.

FIGS. 9 through 11 shows an alternative embodiment of the present invention having one rotatable turbine which is configured in a diagonal orientation. FIGS. 12 through 14 show another alternative embodiment of the present invention having a plurality of rotatable turbines which are configured in a diagonal orientation. FIGS. 15 through 17 show yet another alternative embodiment having a plurality of rotatable turbines 16 which are configured in a vertical orientation. The present embodiments (40, 50, and 60) differs from the embodiment of FIGS. 1 through 8 however in that the grate portion comprises a faceplate (41, 51, and 61) having a webbing layer (42, 52, and 62) attached to the rear surface thereof, wherein the faceplate is sufficiently rigid in order to support the turbine generally within the plane of the grate portion in its predetermined orientation. The faceplates (41, 51, and 61) are preferably made from a sheet of metal having apertures therein thereby forming rib-like crosspieces (43, 53, and 63). In addition to providing support for the turbine, the crosspieces provide protection for the softer plastic webbing from damage due to larger debris such as rocks or sticks which inadvertently strike the device (40, 50 and 60). Nevertheless, it is to be understood that the webbing layer of the present embodiment is similar in design and construction to those typically found on conventional automotive grills.

Although only several embodiments of the present invention are disclosed herein for the purpose of brevity, it can readily be seen by those skilled in the art that virtually any type of automotive grill may be constructed having any quantity of turbines which are configured in virtually any orientation which are aesthetically coordinated with the geometric pattern formed on the outer surface of the automotive grill. Thus, the present invention may be embodied in other specific forms without departing from the spirit or scope of the invention. For example, the turbine structures as described are selectively removable from the grill via the aforedescribed axle mounts, however it is to be understood that rotatable turbine structures may be implemented, which are rotatingly affixedly attached to the grill via axles which are not removable. Moreover, the aforedescribed rotatable turbine structures may be implemented, which are adapted for attachment to existing automotive grills, thereby defining a "retrofit" device. Therefore, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An automotive grill for placement over an air-inlet of a conventional automobile, said grill comprising:
   a generally planar shaped grate portion having a front surface, rear surface, and an outer periphery which is adapted to cover said air-inlet while allowing airflow to generally pass freely therethrough; and,
   at least one rotatable turbine having a plurality of blades which are interconnected about an axis, said plurality blades adapted for generating rotational motion of said turbine due to airflow instant thereupon, said axis being rotatably interconnected said grate portion such that at least a portion of said turbine is visible from the front surface of said grate portion.

2. The automotive grill of claim 1, wherein said grate portion includes at least one hole having a periphery which extends from the front surface to the rear surface, wherein said turbine is adapted to be disposed within said hole.

3. The automotive grill of claim 1, wherein said hole has an annular shroud which extends around said periphery, said shroud having a size which is larger than said turbine in order to allow the turbine to rotate freely within said shroud.

4. The automotive grill of claim 2, wherein said at least one hole is centrally disposed in said grate portion.

5. An automotive grill for placement over an air-inlet of a conventional automobile, said grill comprising:
   a generally planar shaped grate portion having a front surface, rear surface, and an outer periphery which is adapted to cover said air-inlet while allowing airflow to generally pass freely therethrough, said grate portion having at least one hole having a periphery which extends from the front surface to the rear surface, wherein said hole has an annular shroud which extends around said periphery for receipt of;
   at least one rotatable turbine having a plurality of blades which are interconnected about an axis, said plurality blades adapted for generating rotational motion of said turbine due to airflow instant thereupon, said axis being rotatably interconnected to said grate portion such that at least a portion of said turbine is visible from the front surface of said grate portion.

6. The automotive grill of claim 5, wherein said at least one hole is centrally disposed in said grate portion.

7. The automotive grill of claim 5, wherein said axis comprises a hub which is attached to said plurality of blades, said hub having an axis hole centrally disposed therein for rotational interconnection to an elongated rod having two ends defining an axle, said axle is releasably mounted to said grate portion via a pair of axle mounts which selectively mount the ends of said axle to said grate portion.

8. The automotive grill of claim 7, wherein the axis of said axle is generally parallel to the plane formed by said grate portion.

9. The automotive grill of claim 7, wherein the axis of said axle is horizontal with respect to said grate portion.

10. The automotive grill of claim 7, wherein the axis of said axle is diagonal with respect to said grate portion.

11. The automotive grill of claim 7, wherein the axis of said axle is vertical with respect to said grate portion.

12. An automotive grill for placement over an air-inlet of a conventional automobile, said grill comprising:
- a generally planar shaped grate portion having a front surface, rear surface, and an outer periphery which is adapted to cover said air-inlet while allowing airflow to generally pass freely therethrough;
- at least one hole in said grate portion having a periphery which extends from the front surface to the rear surface, wherein said hole has an annular shroud which extends around said periphery for receipt of;
- at least one rotatable turbine having a plurality of blades which are interconnected to a hub, wherein said hub has an axis hole which is centrally disposed therein, said plurality of blades being adapted for generating rotational motion of said turbine due to airflow instant thereupon; and,
- an elongated axle having two ends, said axle being disposed within axis hole such that said turbine freely rotates thereabout, said axle is releasably mounted to said grate portion via a pair of axle mounts which selectively mount the ends of said axle to said grate portion;
- whereby said axle being releasably mounted to said grate portion such that at least a portion of said turbine is visible from the front surface of said grate portion.

13. The automotive grill of claim 12, wherein said axis hole and said elongated axle has an oil-filled sleeve bearing disposed therebetween.

14. The automotive grill of claim 12, wherein said axle is generally parallel to the plane formed by said grate portion.

15. The automotive grill of claim 12, wherein said at least one hole is centrally disposed in said grate portion.

16. The automotive grill of claim 12, wherein said plurality of blades form a profile, wherein said profile is generally oval in shape.

17. The automotive grill of claim 12, wherein said plurality of blades form a profile, wherein said profile being a shape which is selected from the group consisting of circles, rectangles, frusto-circles, and frusto-ovals.

18. The automotive grill of claim 12, wherein each of said plurality of blades is generally helical in shape.

* * * * *